US010864630B2

(12) United States Patent
Abe

(10) Patent No.: US 10,864,630 B2
(45) Date of Patent: Dec. 15, 2020

(54) CONTROL DEVICE AND MACHINE LEARNING DEVICE

(71) Applicant: FANUC CORPORATION, Yamanashi (JP)

(72) Inventor: Hiroshi Abe, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 221 days.

(21) Appl. No.: 16/189,187

(22) Filed: Nov. 13, 2018

(65) Prior Publication Data

US 2019/0152055 A1     May 23, 2019

(30) Foreign Application Priority Data

Nov. 22, 2017   (JP) ................................ 2017-224275

(51) Int. Cl.
    *B25J 9/16*        (2006.01)
    *B25J 13/08*       (2006.01)

(52) U.S. Cl.
    CPC ............. *B25J 9/1612* (2013.01); *B25J 9/161* (2013.01); *B25J 9/163* (2013.01); *B25J 13/085* (2013.01)

(58) Field of Classification Search
    CPC ........ B25J 9/1612; B25J 9/163; B25J 9/1697; B25J 15/0683; B25J 15/08; B25J 19/04; B25J 9/161; B25J 9/1669; G05B 13/027; G05B 2219/39057; G05B 2219/39289; G05B 2219/39543; G05B 2219/40053; G06N 3/02
    See application file for complete search history.

(56) References Cited

U.S. PATENT DOCUMENTS

| 10,603,790 | B2* | 3/2020 | Gotou | .................. G06N 3/008 |
| 2014/0028118 | A1 | 1/2014 | Sakano | |
| 2016/0059412 | A1* | 3/2016 | Oleynik | ................... B25J 19/02 700/257 |
| 2017/0028562 | A1* | 2/2017 | Yamazaki | ............. B25J 9/1697 |
| 2017/0348854 | A1* | 12/2017 | Oleynik | ................ A47J 47/02 |
| 2018/0311824 | A1* | 11/2018 | Wada | ...................... B25J 13/08 |
| 2019/0091869 | A1* | 3/2019 | Yamazaki | ............. B25J 9/1697 |
| 2019/0126471 | A1* | 5/2019 | Kobayashi | ............ B25J 9/1669 |

(Continued)

FOREIGN PATENT DOCUMENTS

| JP | 2014-024134 A | 2/2014 |
| JP | 2019084601 A | 6/2019 |
| JP | 2019093461 A | 6/2019 |

OTHER PUBLICATIONS

Notice of Reasons for Refusal for Japanese Application No. 2017-224275, dated Oct. 15, 2019, with translation, 8 pages.

*Primary Examiner* — Bhavesh V Amin
(74) *Attorney, Agent, or Firm* — RatnerPrestia

(57) ABSTRACT

A control device and a machine learning device enable control for gripping an object having small reaction force. The machine learning device included in the control device includes a state observation unit that observes gripping object shape data related to a shape of the gripping object as a state variable representing a current state of an environment, a label data acquisition unit that acquires gripping width data, which represents a width of the hand of the robot in gripping the gripping object, as label data, and a learning unit that performs learning by using the state variable and the label data in a manner to associate the gripping object shape data with the gripping width data.

7 Claims, 5 Drawing Sheets

(56) References Cited

U.S. PATENT DOCUMENTS

2019/0152054 A1\* 5/2019 Ishikawa .................. B25J 9/163
2019/0152055 A1\* 5/2019 Abe ......................... B25J 9/161
2019/0295244 A1\* 9/2019 Adachi ................ G06K 9/6271

\* cited by examiner

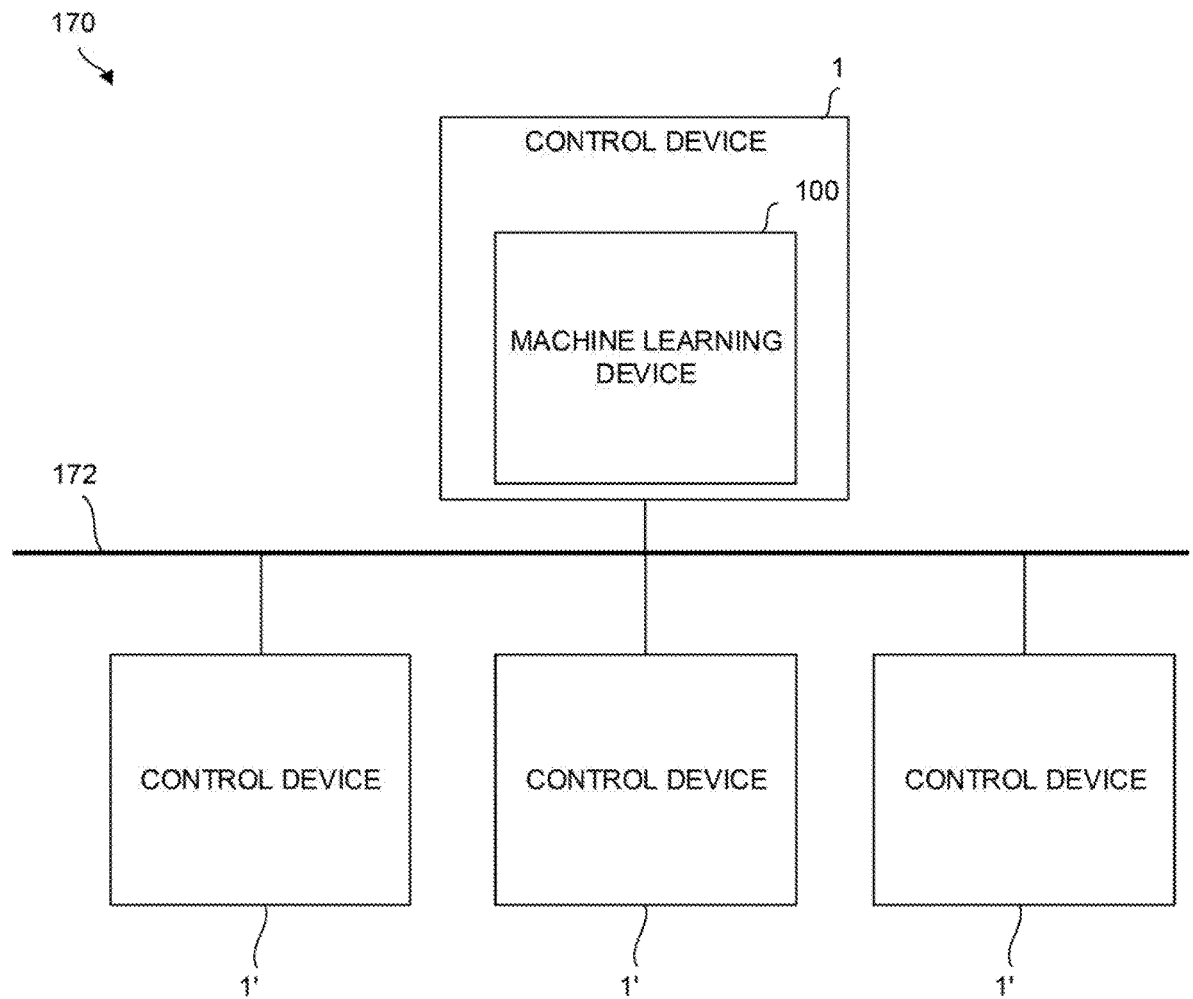

CONTROL DEVICE AND MACHINE LEARNING DEVICE

CROSS-REFERENCE TO RELATED APPLICATIONS

This application is a new U.S. Patent Application that claims benefit of Japanese Patent Application No. 2017-224275, filed Nov. 22, 2017, the disclosure of this application is being incorporated herein by reference in its entirety for all purposes.

BACKGROUND OF THE INVENTION

1. Field of the Invention

The present invention relates to a control device and a machine learning device and especially relates to a control device and a machine learning device that perform control for gripping an object having small reaction force.

2. Description of the Related Art

Gripping an object with a machine through control has been conventionally realized such that a mechanical mechanism part for gripping an object is brought into contact and pressed against the object so as to feed back a current value of a motor and power and moment detected by a force sensor to power for gripping the object (Japanese Patent Application Laid-Open No. 2014-024134, for example).

In general, reaction force from an object is required to detect a current value of a motor and detect power and moment by a force sensor. However, enough reaction force cannot be detected in gripping an object having small reaction force such as a soft object: tofu and a cream puff, for example, so that it is difficult to perform control for gripping the object.

Further, a soft object such as a cream puff and bread has a large error in shape thereof. Accordingly, the object may be too strongly gripped and damaged due to the error in the method in which a current value of a motor for driving a mechanism part and power and moment detected by a force sensor are fed back to power to grip an object.

SUMMARY OF THE INVENTION

An object of the present invention is to provide a control device and a machine learning device that enable control for gripping an object having small reaction force.

The control device according to the present invention solves the above-mentioned problem by controlling a gripping position based on machine learning using a length measuring sensor instead of the method for detecting a current value of a motor and power and moment by a force sensor.

A control device according to an aspect of the present invention that estimates a gripping width of a hand of a robot in gripping a gripping object having small reaction force includes: a machine learning device that learns estimation for the gripping width of the hand of the robot in gripping the gripping object, with respect to a shape of the gripping object; a state observation unit that observes gripping object shape data related to the shape of the gripping object as a state variable representing a current state of an environment; a label data acquisition unit that acquires gripping width data, which represents the gripping width of the hand of the robot in gripping the gripping object, as label data; and a learning unit that performs learning by using the state variable and the label data in a manner to associate the gripping object shape data with the gripping width data.

A machine learning device according to another aspect of the present invention that learns estimation for a gripping width of a hand of a robot in gripping a gripping object with respect to a shape of the gripping object having small reaction force includes: a state observation unit that observes gripping object shape data related to the shape of the gripping object as a state variable representing a current state of an environment; a label data acquisition unit that acquires gripping width data, which represents the gripping width of the hand of the robot in gripping the gripping object, as label data; and a learning unit that performs learning by using the state variable and the label data in a manner to associate the gripping object shape data with the gripping width data.

According to the present invention, a machine can be made securely grip an object having small reaction force without damaging the object.

BRIEF DESCRIPTION OF THE DRAWINGS

The above-described and other objects and features of the present invention will be apparent from the following embodiment which is described in reference to the accompanying drawings. Among these drawings:

FIG. 5 is a functional block diagram schematically illustrating an aspect of a system in which a control device is incorporated.

DETAILED DESCRIPTION OF THE PREFERRED EMBODIMENT

An embodiment of the present invention is described below with reference to the accompanying drawings.

Figure 1:
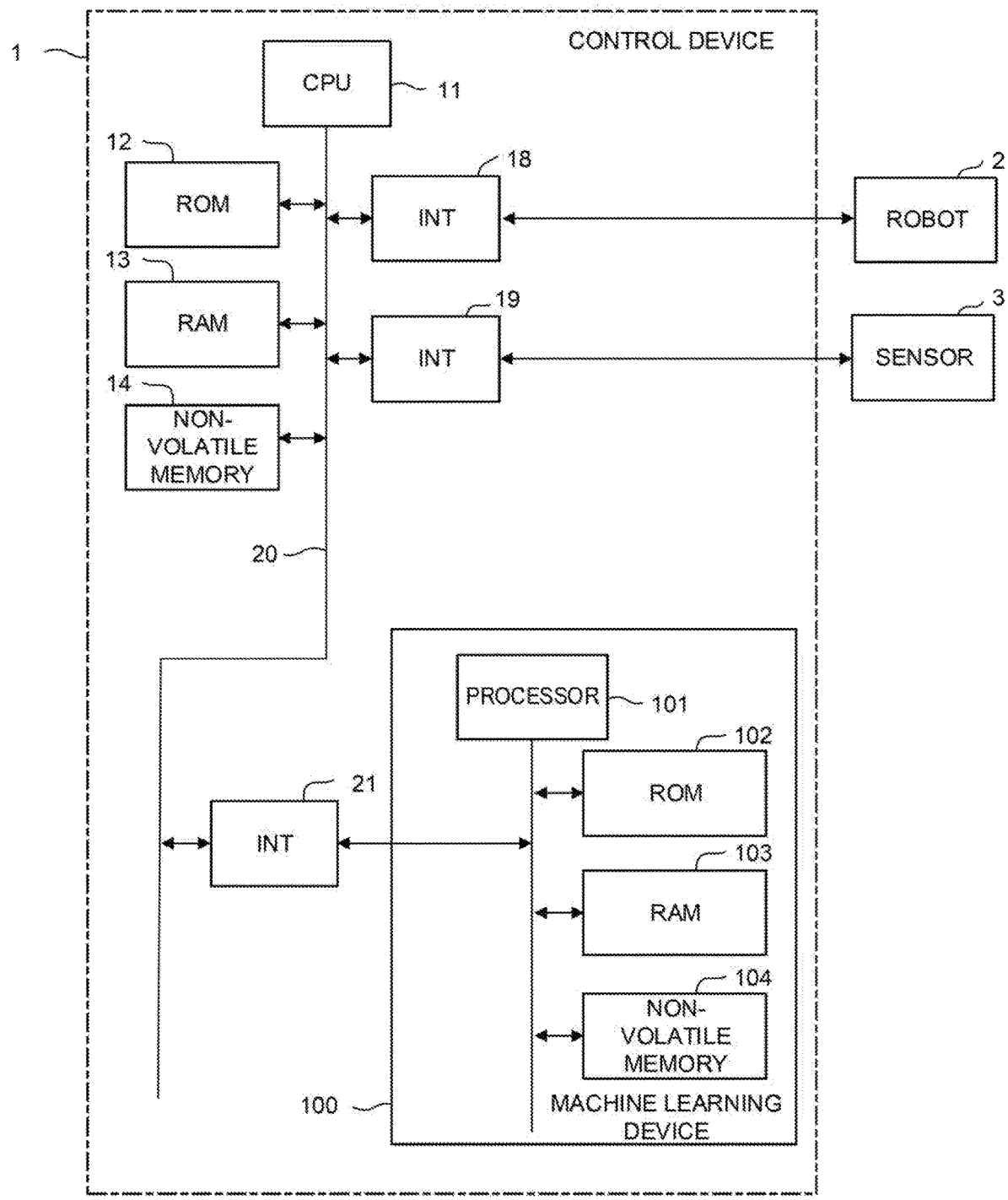
FIG. 1 is a hardware configuration diagram schematically illustrating a control device according to an embodiment.

FIG. 1 is a hardware configuration diagram schematically illustrating substantial parts of a control device according to a first embodiment. A control device 1 can be mounted as a control device for controlling a robot, for example. Further, the control device 1 can be mounted as a computer such as a cell computer, a host computer, and a cloud server that is connected with a control device controlling a robot via a network. FIG. 1 illustrates an example of a case that the control device 1 is mounted as a control device controlling a robot.

A CPU 11 included in the control device 1 according to the present embodiment is a processor for entirely controlling the control device 1. The CPU 11 reads out a system program stored in a ROM 12 via a bus 20 and controls the whole of the control device 1 in accordance with the system program. A RAM 13 temporarily stores temporary calculation data and display data and various kinds of data which are inputted by an operator via an input unit, which is not shown, for example.

A non-volatile memory 14 is backed up by a battery, which is not shown, for example, and thus, the non-volatile memory 14 is configured as a memory whose storage state is maintained even when the control device 1 is turned off.

The non-volatile memory 14 stores, for example, control programs which are read in via an interface, control programs which are inputted via a display/MDI unit, and various kinds of data which are acquired from a robot 2 and a sensor 3. The control programs stored in the non-volatile memory 14 may be developed on the RAM 13 when the control programs are used. Further, various kinds of system programs required for an operation of the control device 1 (including a system program for controlling exchange with a machine learning device 100) are preliminarily written in the ROM 12.

The control device 1 outputs commands for controlling a joint and a hand, for example, of the robot 2 with respect to the robot 2 via an interface 18 based on the control programs and the like. Further, the control device 1 acquires data from each unit of the robot 2 via the interface 18.

Further, the control device 1 acquires data detected by at least one sensor (a length measuring sensor for measuring the length of a gripping object, a camera for taking an image of the gripping object, and sensors for ambient temperature and ambient humidity, for example) attached to the periphery or each unit of the robot via an interface 19.

An interface 21 is an interface for connecting the control device 1 with the machine learning device 100. The machine learning device 100 includes a processor 101 that entirely controls the machine learning device 100, a ROM 102 that stores system programs and the like, a RAM 103 that performs temporary storage in each processing related to machine learning, and a non-volatile memory 104 that is used for storing learning models and the like. The machine learning device 100 is capable of observing various information (the length of a gripping object, an appearance of the gripping object, ambient temperature, and ambient humidity, for example) which can be acquired by the control device 1, via the interface 21. Further, the control device 1 controls the gripping width of the hand set when the robot 2 grips a gripping object, for example, based on a value outputted from the machine learning device 100.

Figure 2:
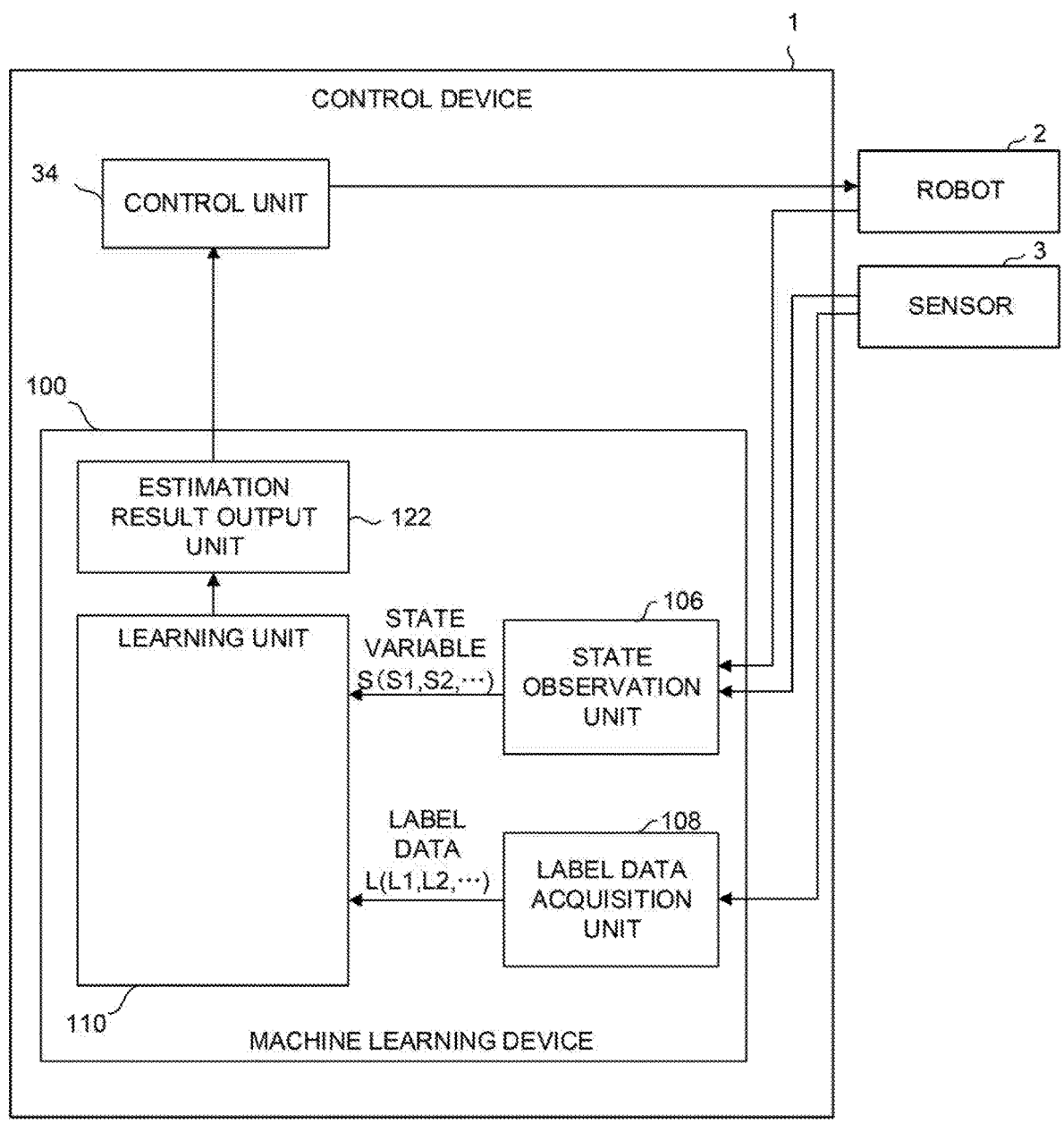
FIG. 2 is a functional block diagram schematically illustrating the control device according to an embodiment.

FIG. 2 is a functional block diagram schematically illustrating the control device 1 and the machine learning device 100 according to the first embodiment. Functional blocks illustrated in FIG. 2 are realized when the CPU 11 included in the control device 1 and the processor 101 of the machine learning device 100 which are illustrated in FIG. 1 execute respective system programs and respectively control an operation of each unit of the control device 1 and the machine learning device 100.

The control device 1 according to the present embodiment includes a control unit 34 that controls the robot 2 based on the control programs stored in the non-volatile memory 14 and an estimation result, which is outputted from the machine learning device 100, of the gripping width of the hand set when the robot 2 grips a gripping object.

Meanwhile, the machine learning device 100 included in the control device 1 includes software (a learning algorithm, for example) and hardware (the processor 101, for example) by which the machine learning device 100 itself learns estimation for the width of the hand of the robot 2 in gripping a gripping object, with respect to the shape of the gripping object, through so-called machine learning. What the machine learning device 100 included in the control device 1 learns corresponds to a model structure representing a correlation between a shape of a gripping object and the gripping width of the hand of the robot 2 in gripping the gripping object.

As illustrated in the functional block of FIG. 2, the machine learning device 100 included in the control device 1 includes a state observation unit 106, a label data acquisition unit 108, a learning unit 110, and an estimation result output unit 122. The state observation unit 106 observes gripping object shape data S1 representing a shape of a gripping object as one of state variables S representing current states of an environment. The label data acquisition unit 108 acquires label data L including gripping width data L1 representing the gripping width of the hand of the robot 2 in gripping a gripping object. The learning unit 110 performs learning based on the state variables S and the label data L in a manner to associate the shape of a gripping object with the gripping width of the hand of the robot 2 in gripping the gripping object. The estimation result output unit 122 outputs the gripping width of the hand of the robot 2 in gripping a gripping object, which is estimated based on the shape of a gripping object by using a learned model obtained by the learning unit 110.

The state observation unit 106 acquires the gripping object shape data S1 as the state variable S from the sensor 3 in learning by the learning unit 110. Further, the state observation unit 106 acquires the gripping object shape data S1 as the state variable S from the sensor 3 when the width of the hand of the robot 2 in gripping a gripping object is estimated by using a learning result of the learning unit 110. For either case, the state observation unit 106 may acquire data via the non-volatile memory 14 of the control device 1, for example, instead of directly acquiring the data from the sensor 3.

Among the state variables S observed by the state observation unit 106, the length (lateral width) of a gripping object on a gripping position of the robot, for example, may be used as the gripping object shape data S1 in the simplest configuration. The length of a gripping object on a gripping position of the robot can be acquired as a value detected by a length measuring sensor attached on the robot 2 or on a nearby position of the robot 2 and a value obtained by analyzing an image taken by a camera attached on the robot 2 or on a nearby position of the robot 2, for example. Further, data such as the height of a gripping object and an image of the gripping object taken by a camera attached on the robot 2 or on a nearby position of the robot 2 may be used as the gripping object shape data S1.

The label data acquisition unit 108 acquires the gripping width data L1, which is related to the gripping width of the hand of the robot 2 in gripping a gripping object, as the label data L from the robot 2 in learning by the learning unit 110. Here, the label data acquisition unit 108 may acquire data via the non-volatile memory 14 of the control device 1, for example, instead of directly acquiring the data from the robot 2. Data for the gripping width of the hand of the robot 2, which is set when gripping of the gripping object by the robot 2 is successful, for example, can be used as the gripping width data L1. Whether gripping of a gripping object by the robot 2 is successful or failed may be inputted by an operator through an input device which is not illustrated, may be automatically determined by analyzing an image taken by a camera attached on the robot 2 or on a nearby position of the robot 2, or may be determined based on a value detected by a sensor installed on a placing position for the gripping object. Note that the label data acquisition unit 108 is used in learning by the learning unit 110 and is not necessarily required as a component of the machine learning device 100 after the learning by the learning unit 110 is completed.

The learning unit 110 learns the label data L (the gripping width data L1 representing the width of the hand of the robot 2 in gripping a gripping object) with respect to the state variable S (the gripping object shape data S1 representing the shape of the gripping object) in accordance with arbitrary learning algorithms collectively called machine learning. The learning unit 110 is capable of learning a correlation between the gripping object shape data S1 included in the state variable S and the gripping width data L1 included in the label data L, for example. The learning unit 110 is capable of repeatedly executing learning based on a data set including the state variables S and the label data L.

It is desirable for the learning unit 110 to execute a plurality of learning cycles based on data respectively obtained for a plurality of robots 2, in learning. Through repetition of such a learning cycle, the learning unit 110 automatically interprets the correlation between the shape of a gripping object (the gripping object shape data S1) and the width of the hand of the robot 2 in gripping the gripping object (the gripping width data L1). Though the correlation of the gripping width data L1 with respect to the gripping object shape data S1 is substantially unknown at the start of the learning algorithm, the learning unit 110 gradually interprets a relation of the gripping width data L1 with respect to the gripping object shape data S1 as the learning unit 110 advances the learning. With the learned model consequently obtained, the learning unit 110 can interpret the correlation of the gripping width data L1 with respect to the gripping object shape data S1.

The estimation result output unit 122 estimates the gripping width of the hand of the robot 2 in gripping a gripping object from the shape of the gripping object based on a result obtained through learning by the learning unit 110 (learned model) and outputs the estimated width of the hand of the robot 2 in gripping the gripping object. More specifically, the gripping width data L1 related to the width of the hand of the robot 2 in gripping a gripping object, which is learned by the learning unit 110 in a manner to be associated with the gripping object shape data S1 representing the shape of a gripping object, represents the width of the hand to be commanded to the robot 2 by the control unit 34 when making the robot 2 grip the gripping object, and this value is outputted in estimation using a learned model obtained by the learning unit 110.

As a modification of the machine learning device 100 included in the control device 1, the state observation unit 106 may observe peripheral state data S2, which represents a peripheral state of the robot 2, as the state variable S in addition to the gripping object shape data S1. As the peripheral state data S2, ambient temperature of the robot 2, for example, is exemplified. Further, as another example of the peripheral state data S2, ambient humidity of the robot 2 is cited.

According to the above-described modification, the machine learning device 100 is capable of performing learning in a manner to associate the gripping object shape data S1 and the peripheral state data S2 with the gripping width data L1. Therefore, the machine learning device 100 can highly accurately learn and estimate variation of the proper gripping width of the hand of the robot 2 when making the robot 2 grip a gripping object whose softness and so on change depending on ambient temperature (rice cake, for example) and a gripping object whose softness, friction of the surface, and so on change depending on ambient humidity (cream puff, for example).

As another modification of the machine learning device 100 included in the control device 1, the state observation unit 106 may observe kind data S3, which represents a kind of a gripping object, as the state variable S in addition to the gripping object shape data S1.

According to the above-mentioned modification, the machine learning device 100 is capable of performing learning in a manner to associate the gripping object shape data S1 and the kind data S3 with the gripping width data L1, so that the machine learning device 100 can highly accurately learn and estimate variation of the proper width, which varies depending on change of the kind, of the hand of the robot 2.

Figure 3:
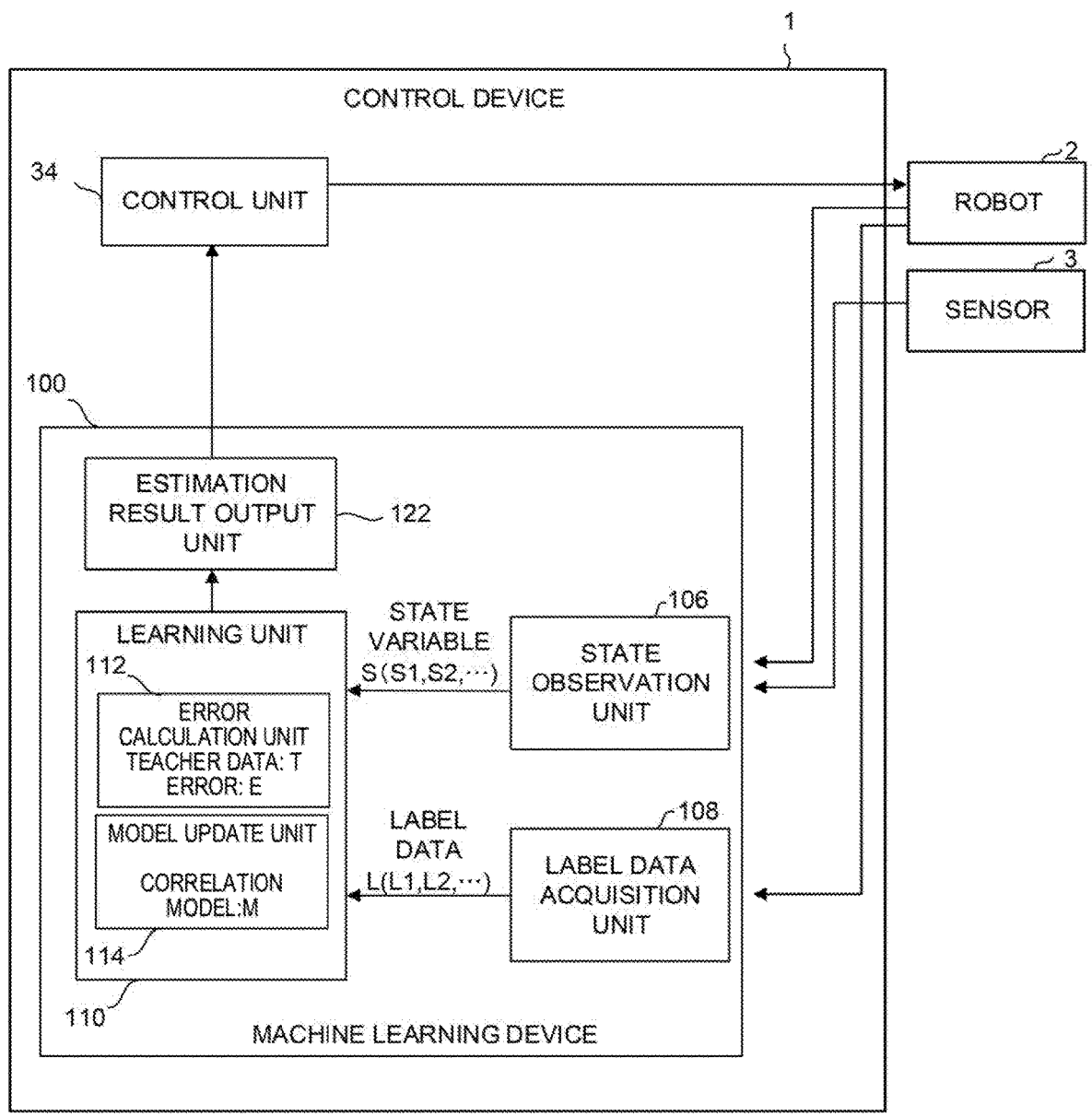
FIG. 3 is a functional block diagram schematically illustrating an aspect of the control device.

In the machine learning device 100 having the above-described configuration, a learning algorithm executed by the learning unit 110 is not especially limited but a known learning algorithm can be employed as machine learning. FIG. 3 illustrates another aspect of the control device 1 illustrated in FIG. 2, which has the configuration including the learning unit 110 that executes supervised learning as another example of the learning algorithm. The supervised learning is a method in which known data sets including inputs and outputs respectively corresponding to these inputs (referred to as teacher data) are provided and a feature indicating a correlation between an input and an output is identified based on these teacher data so as to learn a correlation model to be used for estimating a required output with respect to a new input.

In the machine learning device 100 included in the control device 1 illustrated in FIG. 3, the learning unit 110 includes an error calculation unit 112 and a model update unit 114. The error calculation unit 112 calculates an error E between a correlation model M used for estimating the gripping width of the hand of the robot 2 in gripping a gripping object based on the shape of the gripping object and a correlation feature identified from teacher data T. The teacher data T is obtained from data of shapes of gripping objects acquired in the past and actual results of the width of the hand of the robot 2 in gripping gripping objects. The model update unit 114 updates the correlation model M so as to reduce the error E. The learning unit 110 learns estimation for the width of the hand of the robot 2 in gripping a gripping object based on the shape of the gripping object, by repeatedly updating the correlation model M by the model update unit 114.

An initial value of the correlation model M is represented by simplifying a correlation between the state variable S and the label data L (for example, by the N-th order function), for example, and is provided to the learning unit 110 before the start of the supervised learning. In the present invention, data of shapes of gripping objects acquired in the past and data of the actual width of the hand of the robot 2 in gripping gripping objects can be used as the teacher data T as described above, and the teacher data T is provided to the learning unit 110 as needed in operation of the control device 1. The error calculation unit 112 identifies a correlation feature indicating a correlation between a shape of a gripping object and the width of the hand of the robot 2 in gripping the gripping object based on the teacher data T which is provided as need to the learning unit 110, and obtains the error E between this correlation feature and the correlation model M corresponding to the state variables S and the label data L in the current state. The model update unit 114 updates the correlation model M in accordance with predetermined update rules, for example, so that the error E is reduced.

In the following learning cycle, the error calculation unit 112 estimates the width of the hand of the robot 2 in gripping a gripping object by using the state variables S in accordance with the updated correlation model M and obtains the error E between the result of the estimation and the label data L which is actually acquired, and the model update unit 114 updates the correlation model M again. Thus, an unknown correlation between a current state of an environment and estimation corresponding to the state gradually becomes apparent.

When the above-described supervised learning is advanced, a neural network can be used.

Figure 4A:
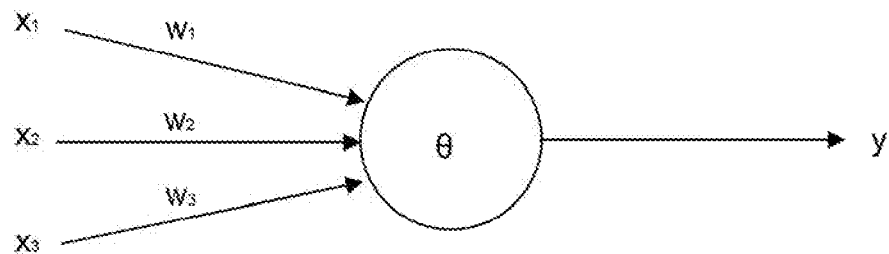
FIG. 4A illustrates a neuron.
Figure 4B:
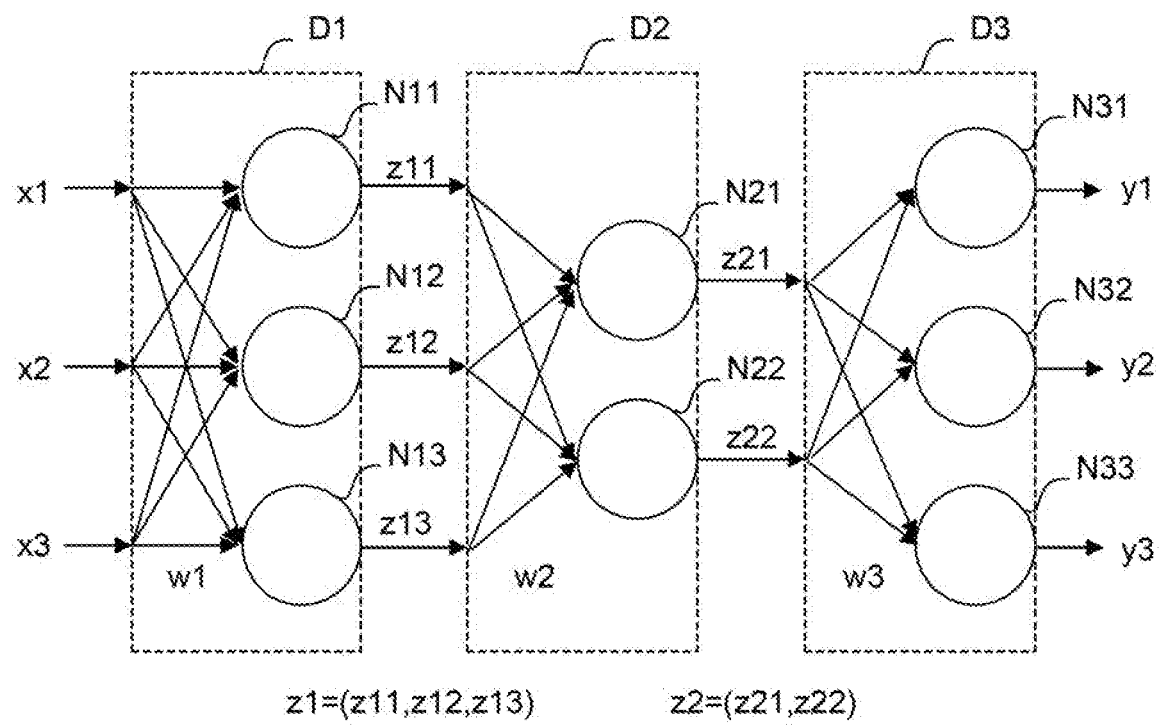
FIG. 4B illustrates a neural network.

FIG. 4A schematically illustrates a model of a neuron. FIG. 4B schematically illustrates a model of a three-layered neural network which is configured by combining the neurons illustrated in FIG. 4A. The neural network can be composed of arithmetic devices, storage devices, or the like, for example, in imitation of the model of neurons.

The neuron illustrated in FIG. 4A outputs a result y with respect to a plurality of inputs x (input $x_1$ to input $x_3$ as an example here). Inputs $x_1$ to $x_3$ are respectively multiplied by weights w ($w_1$ to $w_3$) corresponding to these inputs x. Accordingly, the neuron outputs the output y expressed by Formula 1 below. Here, in Formula 1, all of input x, output y, and weight w are vectors. Further, 0 denotes a bias and $f_k$ denotes an activation function.

$$y = f_k(\Sigma_{i=1}^n x_i w_i - \theta)$$ [Formula 1]

In the three-layered neural network illustrated in FIG. 4B, a plurality of inputs x (input x1 to input x3 as an example here) are inputted from the left side and results y (result y1 to result y3 as an example here) are outputted from the right side. In the example illustrated in FIG. 4B, inputs x1, x2, x3 are each multiplied by corresponding weights (collectively denoted by w1) and each of inputs x1, x2, x3 is inputted into three neurons N11, N12, N13.

In FIG. 4B, an output of each of the neurons N11, N12, N13 is collectively denoted by z1. z1 can be considered as a feature vector obtained by extracting a feature amount of an input vector. In the example illustrated in FIG. 4B, feature vectors z1 are each multiplied by corresponding weights (collectively denoted by w2) and each of feature vectors z1 is inputted into two neurons N21, N22. Feature vector z1 represents a feature between weight w1 and weight w2.

In FIG. 4B, an output of each of the neurons N21, N22 is collectively denoted by z2. z2 can be considered as a feature vector obtained by extracting a feature amount of feature vector z1. In the example illustrated in FIG. 4B, feature vectors z2 are each multiplied by corresponding weights (collectively denoted by w3) and each of feature vectors z2 is inputted into three neurons N31, N32, N33. Feature vector z2 represents a feature between weight w2 and weight w3. Finally, neurons N31 to N33 respectively output results y1 to y3.

Here, the method of so-called deep learning in which a neural network having three or more layers is used may be employed as well.

In the machine learning device 100 included in the control device 1, the learning unit 110 performs calculation of the multilayer structure following the above-described neural network by using the state variable S as an input x, being able to estimate the width (output y) of the hand of the robot 2 in gripping a gripping object based on the value (input x) of the shape of the gripping object. Here, operation modes of the neural network include a learning mode and a value prediction mode. For example, weight w can be learned by using a learning data set in the learning mode and value determination of an action can be performed by using the learned weight w in the value prediction mode.

Here, detection, classification, inference, and so forth can also be performed in the value prediction mode.

The above-described configuration of the machine learning device 100 can be described as a machine learning method (or software) each executed by the processor 101.

This machine learning method is a machine learning method for learning estimation for the width of the hand of the robot 2 in gripping a gripping object, based on the shape of the gripping object. The machine learning method includes a step in which the processor 101 observes the shape of the gripping object (the gripping object shape data S1) as the state variable S representing a current state, a step in which the processor 101 acquires the width of the hand of the robot 2 in gripping the gripping object (the gripping width data L1) as the label data L, and a step in which the processor 101 performs learning by using the state variable S and the label data L in a manner to associate the gripping object shape data S1 with the width of the hand of the robot 2 in gripping the gripping object.

A learned model which is obtained through learning by the learning unit 110 of the machine learning device 100 is applicable as a program module which is part of software related to machine learning. The learned model according to the present invention can be used in a computer provided with a processor such as a CPU and a GPU and a memory. More specifically, the processor of the computer operates to perform calculation by using a shape of a gripping object as an input in accordance with a command from the learned model stored in the memory and to output an estimation result of the width of the hand of the robot 2 in gripping the gripping object based on the calculation result. The learned model according to the present invention can be used in a manner to be copied to other computers via an external storage medium and a network, for example.

Further, when the learned model according to the present invention is copied to other computers to be used in a new environment, further learning can be performed with respect to the learned model based on new state variables and new label data obtained in this new environment. In such a case, a learned model derived from the learned model in this environment (referred to below as a derived model) can be obtained. The derived model according to the present invention is the same as the original learned model on the point that the derived model is used for outputting an estimation result for the gripping width of the hand of the robot 2 in gripping a gripping object based on the shape of the gripping object. However, the derived model is different from the original learned model in that the derived model is used for outputting a result adapted to an environment newer than that of the original learned model. This derived model can be also used in a manner to be copied to other computers via an external storage medium and a network, for example.

Further, it is possible to generate and use a learned model which is obtained by performing learning from the beginning in another machine learning device (referred to below as a distilled model) by using an output, which is obtained with respect to an input to the machine learning device in which the learned model according to the present invention is incorporated (such a learning process is referred to as distillation). In distillation, an original learned model is referred to also as a teacher model and a newly-created distilled model is referred to also as a student model. In general, a distilled model is more suitable to be distributed to other computers via an external storage medium and a network, for example, because the distilled model is smaller in size than an original learned model and exhibits accuracy equivalent to that of the original learned model.

FIG. 5 illustrates a system 170, according to an embodiment, including the control device 1. The system 170 includes at least one control device 1 (which is provided with the machine learning device 100) which is connected to a network, control devices 1' (which are not provided with the machine learning device 100), and a wired/wireless network 172 which connects the control device 1 and the control devices 1' to each other.

In the system 170 having the above-described configuration, the control device 1 provided with the machine learning device 100 is capable of automatically and accurately estimating the width of the hand of the robot 2 in gripping a gripping object with respect to the shape of the gripping object under the control of each of the control device 1 and the control devices 1', by using a learning result of the learning unit 110. Further, the system 170 may be configured so that the machine learning device 100 of the control device 1 learns estimation for the width of the hand of the robot 2 in gripping a gripping object common to all of the control device 1 and the control devices 1' based on the state variables S and the label data L, which are obtained from each of the plurality of control devices 1 and 1', and the learning result is used in control of all of the robots 2. According to the system 170, speed and reliability in learning for estimation for the gripping width of the hand of the robot 2 in gripping a gripping object can be improved by using more various data sets (including the state variables S and the label data L) as inputs.

The embodiment of the present invention has been described above, but the present invention can be embodied in various aspects by adding arbitrary alterations, without being limited only to the examples of the above-described embodiment.

For example, the learning algorithm and calculation algorithm executed by the machine learning device 100, the algorithm executed by the control device 1, and the like are not limited to the above-mentioned algorithms, but various algorithms may be employed.

The above-described embodiment includes the description that the control device 1 and the machine learning device 100 are devices including CPUs different from each other, but the machine learning device 100 may be realized by the CPU 11 included in the control device 1 and the system program stored in the ROM 12.

The embodiment of the present invention has been described above, but the present invention can be embodied in another aspect by adding arbitrary alterations, without being limited to the examples of the above-described embodiment.

The invention claimed is:

1. A control device that estimates a gripping width of a hand of a robot in gripping a gripping object having small reaction force, the control device comprising:
    a machine learning device that learns estimation for the gripping width of the hand of the robot in gripping the gripping object, with respect to a shape of the gripping object;
    a state observation unit that observes gripping object shape data and peripheral state data including at least ambient humidity related to the shape of the gripping object as a state variable representing a current state of an environment;
    a label data acquisition unit that acquires gripping width data, the gripping width data representing the gripping width of the hand of the robot in gripping the gripping object, as label data; and
    a learning unit that performs learning by using the state variable and the label data in a manner to associate the gripping object shape data and the peripheral state data with the gripping width data.

2. The control device according to claim 1, wherein
    the state observation unit further observes kind data, the kind data representing a kind of the gripping object, as the state variable, and
    the learning unit performs learning in a manner to associate the gripping object shape data and the kind data with the gripping width data.

3. The control device according to claim 1, wherein the learning unit includes
    an error calculation unit that calculates an error between a correlation model used for estimating the gripping width of the hand of the robot in gripping the gripping object based on the state variable and a correlation feature identified based on prepared teacher data, and
    a model update unit that updates the correlation model so as to reduce the error.

4. The control device according to claim 1, wherein the learning unit calculates the state variable and the label data in a multilayer structure.

5. The control device according to claim 1, further comprising:
    an estimation result output unit that outputs an estimation result for a width of the hand of the robot in gripping the gripping object, based on a learning result obtained by the learning unit.

6. The control device according to claim 1, wherein the machine learning device exists in a cloud server.

7. A machine learning device that learns estimation for a width of a hand of a robot in gripping a gripping object with respect to a shape of the gripping object having small reaction force, the machine learning device comprising:
    a state observation unit that observes gripping object shape data and peripheral state data including at least ambient humidity related to the shape of the gripping object as a state variable representing a current state of an environment;
    a label data acquisition unit that acquires gripping width data, the gripping width data representing the width of the hand of the robot in gripping the gripping object, as label data; and
    a learning unit that performs learning by using the state variable and the label data in a manner to associate the gripping object shape data and the peripheral state data with the gripping width data.

\* \* \* \* \*